United States Patent [19]

Seiling

[11] 4,159,740
[45] Jul. 3, 1979

[54] DIRECT EXPANSION JACKET FOR HORIZONTAL DOUGH MIXERS

[75] Inventor: Samuel O. Seiling, Richmond, Va.

[73] Assignee: AMF Incorporated, White Plains, N.Y.

[21] Appl. No.: 828,388

[22] Filed: Aug. 29, 1977

[51] Int. Cl.² .................. F28F 13/08; F28F 3/12; F25B 17/00
[52] U.S. Cl. ..................... 165/147; 62/342; 62/526; 165/169; 366/149
[58] Field of Search ............... 62/342, 518, 526, 516, 62/519; 165/169, 147, 94

[56] References Cited

U.S. PATENT DOCUMENTS

| 412,088 | 10/1889 | Haubtman | 165/147 |
|---|---|---|---|
| 976,780 | 11/1910 | Burton | 62/342 |
| 2,274,220 | 2/1942 | Sticelbar | 62/342 |
| 2,545,371 | 3/1951 | Mojonnier et al. | 62/516 |
| 2,610,478 | 9/1952 | Lofstedt | 62/342 |
| 3,318,376 | 5/1967 | Vihl | 165/147 |
| 3,823,771 | 7/1974 | Ludwig | 165/170 |
| 3,848,665 | 11/1974 | Uerlichs | 165/170 |
| 3,871,446 | 3/1975 | Langenberg | 165/169 |

FOREIGN PATENT DOCUMENTS 635970  10/1936  Fed. Rep. of Germany ........... 165/169

Primary Examiner—Charles J. Myhre
Assistant Examiner—Sheldon Richter
Attorney, Agent, or Firm—George W. Price; Charles J. Worth

[57] ABSTRACT

Apparatus for cooling dough in a mixer comprising a multi-section direct expansion jacket provided on the main sheet and both end walls of the mixing bowl, the jacket providing a flow path for liquid coolant progressively increasing in cross-sectional area from the inlet to the outlet, and having flow control and heat transfer maximizing means so that the velocity of coolant flow through and a minimum pressure drop across the flow path remain substantially constant and the liquid coolant is always maintained in contact with the heat transfer surfaces.

8 Claims, 10 Drawing Figures

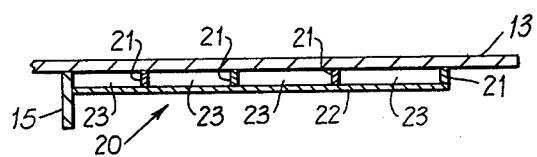
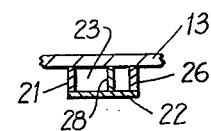
FIG. 3  FIG. 4
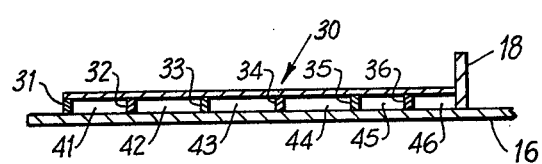
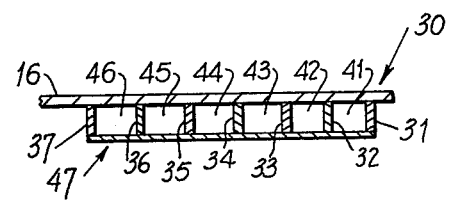
FIG. 6  FIG. 7
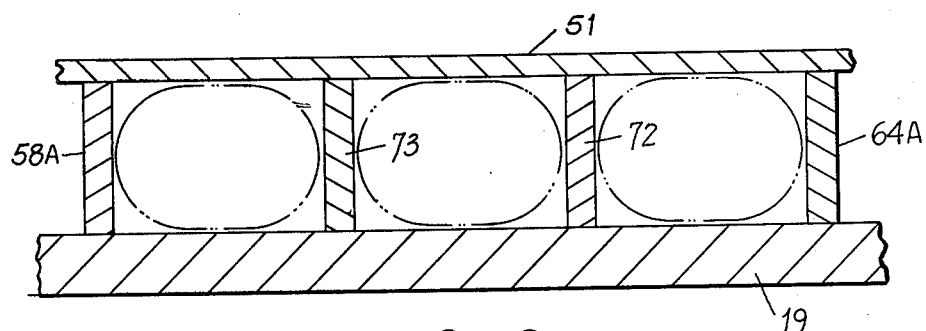
FIG. 9
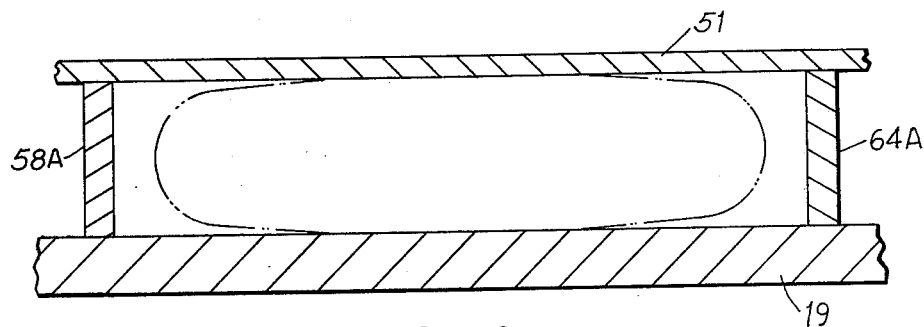
FIG. 9A

DIRECT EXPANSION JACKET FOR HORIZONTAL DOUGH MIXERS

This invention relates generally to dough mixers and more particularly to direct expansion heat transfer means for controlling the temperature of the dough during the mixing and/or kneading cycle.

When mixing dough it is desirable to continue mixing and kneading action to a stage providing the highest gluten development from the flour in the dough that can be obtained. However, all of the mechanical energy to develop the gluten converts to heat within the dough causing the temperature of the dough being mixed to progressively rise. This rise in temperature has been found to be harmful to the quality of the final dough. To reduce mixing time, various heat exchange means and systems have been devised to control the temperature of the dough during the mixing cycle. These have had only limited success; one of the major problems being in the heat transfer means.

The bowl or tub of horizontal dough mixers are substantially U-shaped having by a pair of generally parallel side walls connected together by a semicircular bottom wall which form the mixer shell or main bowl body or sheet portion which is provided with end walls leaving only the upper portion open for charging the bowl with ingredients to be mixed and for removing the dough. Up to this time direct expansion heat exchange means has been limited to the main body portion or the bottom and side walls of the bowl. Such heat exchange means provide a flow of coolant in a single blanket form as taught by U.S. Pat. No. 2,514,301 to D. Tenney, in a parallel transverse path as disclosed by U.S. Pat. No. 2,595,298 to A. W. Ruff, and along a serpentine or repeatedly retroverted path with the runs extending from one end of the bowl to another as in U.S. Pat. No. 2,265,552 to M. A. Sticelbar.

Although serpentine flow paths with the cross-sectional size of the runs increasing from the inlet end to the outlet end of the flow path have been proposed for other types of direct expansion heat exchangers as shown in U.S. Pat. Nos. 1,622,376 to R. W. Davenport and 2,689,839 to W. W. Heckert, nothing has been done in connection with dough mixer bowls to develop a unique coolant flow path to enhance heat transfer.

Accordingly, an object of the present invention is to provide the bowl of a dough mixer with an improved direct expansion heat exchange means with an evaporating type coolant such as freon capable of controlling the temperature of dough ingredients and the resulting dough in the bowl during a mixing cycle.

Another object of the present invention is to provide the novel heat exchange means to the main body portion and end walls of the bowl of a dough mixer.

And, another object of the present invention is to provide the novel heat exchange means with a flow path in which the flow velocity of the coolant is controlled and the thermal transfer area is maximized.

The foregoing and other objects and advantages will appear moe fully hereinafter from a consideration of the detailed description wherein one embodiment of the invention is illustrated by way of example. It is to be expressly understood, however, that the drawing is for illustration purposes only and is not to be construed as defining the limits of the invention.

Figure 2:
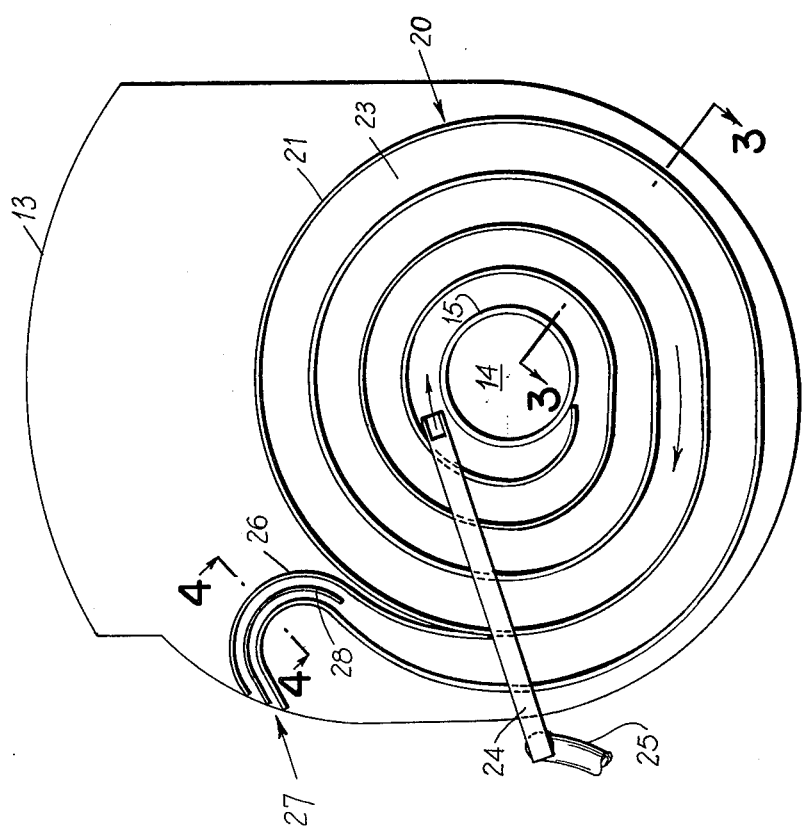
FIG. 2 is an enlarged sectional view taken on one 2—2 of FIG. 1.

FIGS. 3 and 4 are further enlarged fragmentary sectional views taken on lines 3—3 and 4—4 respectively, of FIG. 2.

Figure 1:
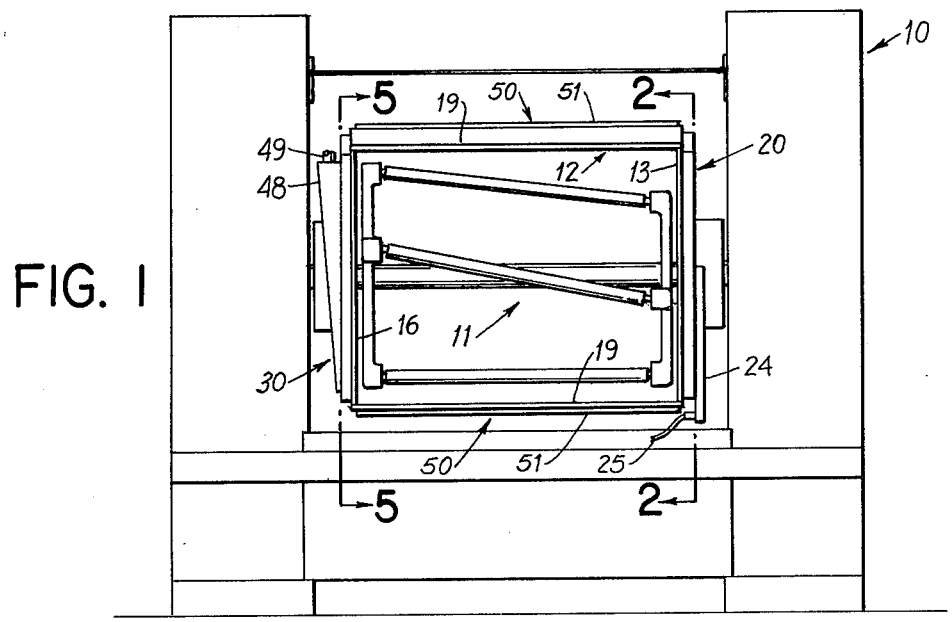
FIG. 1 is a front elevational view of a horizontal dough mixer having the novel direct expansion heat exchange means in accordance with the present invention.
Figure 5:
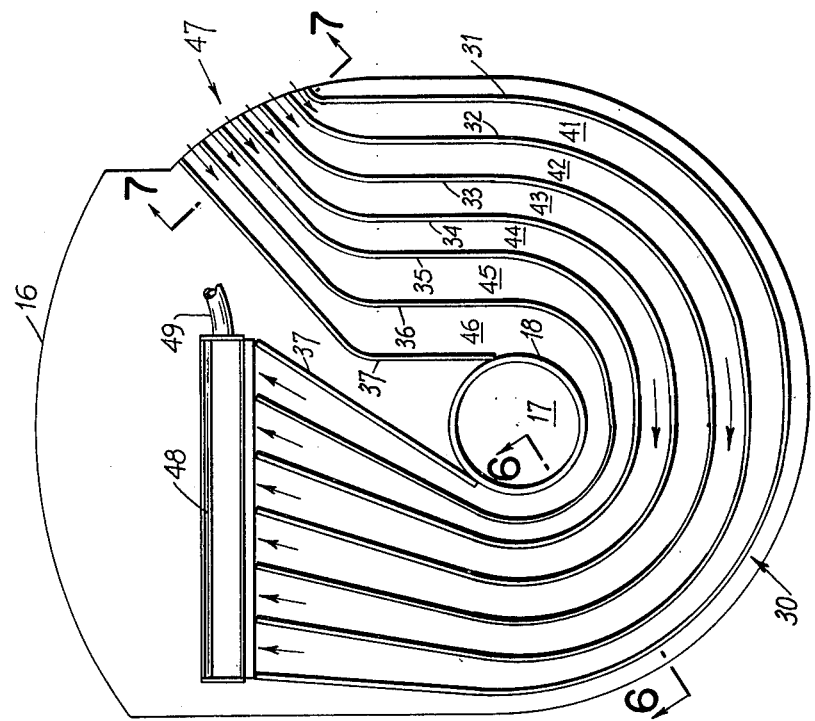

FIG. 5 is an enlarged sectional view taken on line 5—5 of FIG. 1.

FIGS. 6 and 7 are further enlarged fragmentary sectional views taken on lines 6—6 and 7—7, respectively, of FIG. 5.

Figure 8:
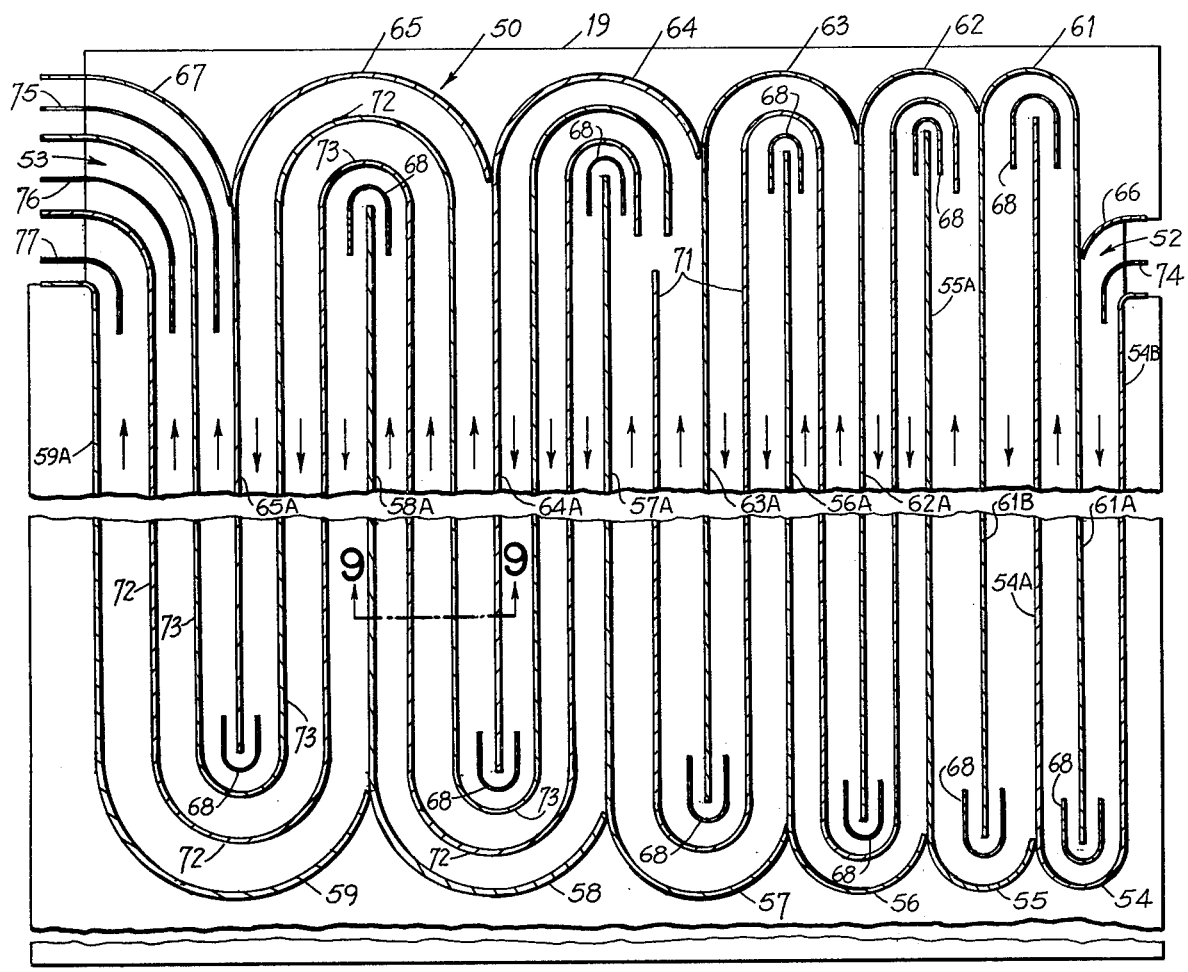

FIG. 8 is an enlarged developed view of the main body portion of the mixer bowl made in accordance with the present invention with the outer surface of the direct expansion jack removed to mroe clearly illustrate the main portion of the flow path of the novel heat exchange means.

FIG. 9 is an enlarged sectional view of one run of the main flow path taken on line 9—9 of FIG. 8.

FIG. 9A is a sectional view similar to FIG. 9 illustrating coolant fluid in a flow path not made in accordance with the present invention.

In a dough mixer the transfer of heat from the dough to the coolant or refrigerant is proportional to the heat transfer surface area and to the temperature difference between the dough and the coolant, and inversely proportional to the resistance to the overall heat transfer from the dough to the coolant through the coolant jacket. This resistance has three components, namely: resistance to heat transfer from the dough to the jacket wall, flow through the jacket wall and from the jacket wall to the coolant.

There is little that can be done to change the resistance to heat transfer from the dough to the jacket wall since it is dependent upon the type of dough being mixed. However, the resistance to heat transfer through the jacket wall can be minimized by optimized selection of the material and the thickness of the wall. The resistance to heat flow from the jacket wall to the liquid coolant can be minimized by insuring that the liquid coolant is in full or maximum contact with the jacket wall at all times. Heat transfer can also be enhanced by maximizing the area of the heat transfer wall, and by controlling flow and pressure of the coolant.

Referring now to the drawings and particularly to FIG. 1, a typical horizontal dough mixer 10 has an agitator 11, mounted on a shaft for movement within the mixing bowl 12 which is provided with a direct expansion jacket or heat transfer means on the main body or sheet portion and end walls in accordance with the present invention. It should be understood that the mixing bowl 12 forms the inner walls or surfaces of the novel direct expansion jacket or heat transfer means which has three distinct component sections. The initial or inlet jacket portion 20 and the terminal or discharge jacket portion 30 are provided on bowl end walls 13 and 16, respectively, and the main jacket portion 50 is provided on the main body or sheet portion 19 of the bowl 12 comprising the two side walls and the bottom wall. The shaft of the agitator 11 extends through the end walls 13 and 16 in the usual manner, as shown.

Referring now to FIGS. 2, 3 and 4, the inlet portion 20 of the direct expansion jacket is provided on the bowl end wall 13 which has a shaft opening 14 and a ring or collar 15. A spiral wall 21 is connected between the outer wall 22 of the jacket portion 20 and end wall 13 which forms the inner wall of that jacket portion.

The wall 21 is made of a suitable heat conducting material and defines a flow path 23 for a liquid coolant, such as freon, which spirals outwardly from the collar and progressively increases in cross-sectional area.

A supply conduit 24, connected at its outer end to a flexible supply line 25, supplies liquid coolant to the innermost run of the spiral flow path 23 adjacent the collar 15. The outer end of the wall 21 is provided with a reverse curve or is otherwise suitably shaped to extend to the edge of the wall 13 and with a short wall 26 defines the outlet 27 of the flow path 23 which is preferably provided with a vane 28 to minimize flow friction of the liquid coolant in that area.

Although the width of the final or outlet portion 27 of the flow path 23 defined by the walls 21 and 26 reduces, the depth of that portion of the flow path increases and the cross-sectional area remains substantially constant except for the normal rate of increase in cross-sectional area of the flow path 23, as shown by comparison of FIGS. 3 and 4. The walls 21 and 26 and the vane 28, which are of a suitable heat conducting material, are contacted by the flow of liquid coolant in the flow path 23 and act as vanes which assist in transferring heat from the end wall 13 to the flow of liquid coolant. It should be appreciated that the major portion of the end wall 13 and at least that portion of the wall which would be contacted by the dough being mixed is directly contacted by the liquid in the flow path 23.

Referring now to FIGS. 5, 6 and 7, the outlet portion 30 of the direct expansion jacket is on the bowl end wall 16 which has a shaft opening 17 and a ring or collar 18 corresponding to and axially aligned with the opening 14 and collar 15, respectively, of the bowl end wall 16. There are seven spaced walls 31 . . . 37 which are connected between the outer wall 38 of the jacket portion 30 and the bowl end wall 16 which forms the inner heat transferring wall of the jacket portion.

The wals 31 . . . 37 define six substantially parallel flow paths 41 . . . 46 which extend from an inlet 47 the edge of the bowl end wall 13, around the collar 18 to a manifold 48 which is connected to a flexible discharge or return line 49. Wall 37 is provided in two pieces joined together by the collar 18. Although the width of each of the flow paths 41 . . . 46 appears to be substantially smaller at the inlet 47, they are greater in depth in this area and the cross-sectional area of each of the flow paths remains substantially constant except for the normal rate of increase in cross-sectional area of the flow paths 41 . . . 47, as shown by comparison of FIGS. 6 and 7.

Referring now to FIG. 8, the main jacket portion 50 is provided with a multi-section wall construction connected between the jacket outer wall 51 and the body or sheet 19 of the bowl 12, and defines a serpentine or repeatedly retroverted flow path starting with an inlet 52 at one end of the sheet 19 in communication with the outlet 27 of the flow path 23, and terminating with an outlet 53 at the other end of the sheet 19 in communication with the inlet 47 of the flow paths 41 . . . 46. The runs of the flow path extend transversely of the agitator shaft from one end of sheet 19 to the other and are connected in series between the inlet 52 and outlet 53. Although the number of runs is limited in number to twelve for description purposes, this is not intended to be a limitation of the invention since the number of runs must be determined by the bowl size and the capacity of the specific cooling system required.

More specifically, there are two wall sections spaced from each other each extending along one of the sides of the sheet 19. One section is formed by interconnected arcuate wall members 54 . . . 59 and the other section is formed by interconnected arcuate wall members 61 . . . 65. The wall member 54 is U-shaped with one of the legs 54A extending toward and terminating short of wall member 61 while the end of the other leg 54B is bent and with an arcuate wall 66 defines the inlet 52. Wall member 61 is also U-shaped having its legs 61A and 61B extending toward and terminating short of the arcuate walls 54 and 55, respectively. Wall members 55, 56, 57, 58, 62, 63, 64, and 65 are J-shaped each having its respective single leg 55A, 56A, 57A, 58A, 62A, 63A, 64A and 65A extending toward and terminating short of the arcuate walls 62, 63, 64, 65, 56, 57, 58 and 59, respectively. Wall 59 is also J-shaped with the end of its leg 59A bent outwardly which with an arcuate wall 67 defines the outlet 53.

A plurality of U-shaped guide vanes 68 are provided, each spaced around the end of one of the legs 61A, 54A, 61B, 55A, 62A, 56A, 63A, 57A, 64A, 58A and 65A to minimize flow friction and prevent undesirable pressure drop. The depth of the serpentine or repeatedly retroverted flow path is held constant while the width and therefor the cross-sectional area of the runs is progressively increased from inlet 52 to outlet 53.

As will be further discussed, a serpentine wall 71 is provided to bifurcate the runs between the pairs of legs 55A and 62A, 62A and 56A, 56A and 63A, and 63A and 57A. Also, a pair of spaced serpentine walls 72 and 73 are provided to trifurcate the runs between the pairs of legs 57A and 64A, 64A and 58A, 68A and 65A, and 65A and 59A. It should be noted that each of the legs 54A . . . 58A, 61A, 61B and 62A . . . 65A forms a straight wall common to two adjacent runs of the serpentine or repeatedly retroverted flow path.

The outwardly bent end of leg 54B and wall 66 are aligned with walls 21 and 26, respectively, of outlet 27 and inlet 52 is provided with a guide vane 74 which is aligned with guide vane 28 to reduce flow friction. The outlet 53 is provided with three guide vanes 75, 76 and 77, which reduce flow friction disposed between walls 67 and 73, walls 73 and 72, and wall 72 and the bent end of the leg 59A. The bent end of leg 59A, vane 77, wall 72, vane 76, wall 73, vane 75 and wall 67 at the outlet 53 are aligned with the walls 31 . . . 37, respectively, at the inlet 47. All of the walls 54 . . . 59, 61 . . . 67, 72 and 73, and guide vanes 68 and 74 . . . 77 are of a heat conducting material and are contracted by the flow of coolant through the jacket portion 50 thereby enhancing the transfer of heat from the sheet 19 to the liquid coolant.

It is well known when heat is transferred to a liquid coolant, such as freon, the cooling is achieved by latent heat of evaporation and the coolant gassifies creating an increase in pressure which, if not relieved will subject the remaining coolant to the increased pressure which will decrease the rate of evaporation and limit the rate of heat transfer. There must be a pressure drop to maintain flow from the inlet to the outlet. However, any excessive pressure down stream will limit evaporation of the coolant and diminish heat transfer. To compensate for the heat transferred from the dough to the coolant which causes the liquid coolant to gasify, the cross-sectional area of the flow path progressively increases from the inlet 24 (FIGS. 1 and 2) to the outlet or discharge manifold 48 (FIGS. 1 and 5).

It is also known that sharp changes of the direction of flow create friction which increases pressure drops. Such flow induced pressure drops again limit evaporation of the coolant which is undesirable. As suppressors, guide vanes 27 and 75 . . . 77 are provided in outlets 27 and 53, respectively, guide vane 74 is provided in the inlet 74 and guide vanes 68 are provided around the ends of the legs 51A . . . 58A, 61A . . . 65A and 61B.

To enhance the transfer of heat from the bowl end walls 13 and 16 and the bowl sheet 19 to the coolant, all walls defining the flow paths and all guide vanes are made of a heat conducting material. By providing the spiral flow path 23 of jacket portion 20, circular flow paths 41 . . . 46 of jacket portion 30, and the serpentine or repeatedly retroverted flow path of jacket portion 50 with runs extending transversely of bowl sheet 19, heat transfer from the dough being mixed to the coolant is maximized.

To maximize heat transfer from the heat conducting surfaces to the coolant, the coolant must contact as much surface area as is available. In flow paths of rectangular cross-section, liquid tends to migrate most strongly toward the corners. Where one pair of sides are much longer than the other of the liquid coolant has gassified, the liquid will contact only portions of the longer sides as shown in FIG. 9A. This situation is eliminated as shown in FIG. 9, by inclusion of the flow dividing serpentine walls 71, 72 and 73 (see also FIG. 8) and the walls 32, 33, 34, 35 and 36 which divide the flow from inlet 47 to the outlet manifold 48 (see FIG. 5).

Accordingly, a substantially constant flow velocity and a minimum pressure drop with enhanced heat transfer areas are achieved in accordance with the present invention.

Although but a single embodiment of the invention has been illustrated and described in detail, it is to be expressly understood that the invention is not limited thereto. Various changes may be made in the design and arrangement of the parts without departing from the spirit and scope of the invention as the same will now be understood by those skilled in the art.

What is claimed is:

1. A multi-section direct expansion jacket provided on the main sheet and end walls of the mixing bowl of a dough mixer having an agitator in said bowl mounted for movement on a shaft extending through said end walls, comprising
    an inlet jacket portion having an outer wall and wall means connected between said outer wall and one of said end walls defining a spiral flow path portion having inlet means at one end adapted to receive a flow of liquid coolant and an outlet at its other end,
    said spiral flow path portion increasing in cross-sectional area from said inlet means to said outlet,
    a second jacket portion having an outer wall and wall means connected between said outer wall and said main bowl sheet defining a repeatedly retroverted flow path portion with an inlet at one end in flow communication with the outlet of said spiral flow path portion and an outlet at its other end,
    said retroverted flow path portion comprising a plurality of runs flow connected in series and extending transversely of said shaft of said agitator,
    each of said runs having a greater cross-sectional area than the adjacent run nearer the inlet, and
    an outlet jacket portion having an outer wall and wall means connected between said outer wall and the other of said end walls defining an arcuate flow path portion having an inlet at one end in flow communication with the outlet of said retroverted flow path portion and a discharge manifold at its other end, and
    said arcuate flow path portion progressively increasing in cross-sectional area from said inlet thereof to said discharge manifold.

2. The multi-section direct expansion jacket in accordance with claim 1, and
    all of said flow path portions forming a flow path increasing in cross-sectional area progressively from said inlet means to said discharge manifold.

3. The multi-section direct expansion jacket in accordance with claim 2, and
    all of said wall means being of a heat conducting material enhancing the transfer of heat from said mixing bowl to the flow of liquid coolant in said flow path.

4. The multi-section direct expansion jacket in accordance with claim 3, and
    adjacent runs of said retroverted flow path being flow connected by an arcuate wall and the end of a wall common to said adjacent runs extending toward said arcuuate wall and being spaced therefrom, and
    a U-shaped vane spaced around the end of said common wall and spaced from said arcuate wall.

5. The multi-section direct expansion jacket in accordance with claim 4, and
    the space between the mixing bowl and said outer wall of each portion of said jacket being uniform, and
    only the width of the flow path of each jacket portion increasing thereby increasing the cross-sectional area of said flow path.

6. The multi-section direct expansion jacket in accordance with claim 4, and
    further wall means connected between said main bowl sheet and said outer wall of said second jacket portion bifurcating at least one run of said retroverted flow path.

7. The multi-section direct expansion jacket in accordance with claim 6, and
    additional wall means connected between said main bowl sheet and said outer wall of said second jacket portion trifurcating at least one run of said retroverted flow path.

8. The multi-section direct expansion jacket in accordance with claim 7, and
    a plurality of spaced wall members connected between said other end wall of said mixing bowl and said outer wall of said outlet jacket portion dividing said arcuate flow path portion into a plurality of flow paths from its inlet to said discharge manifold.

* * * * *